(12) United States Patent
Park et al.

(10) Patent No.: US 6,585,500 B2
(45) Date of Patent: Jul. 1, 2003

(54) VALVE FASTENING STRUCTURE OF A RECIPROCATING COMPRESSOR UTILIZING PERMANENT MAGNETS

(75) Inventors: Kyeong Bae Park, Gwangmyoung (KR); Jong Tae Heo, Changwon (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/985,401

(22) Filed: Nov. 2, 2001

(65) Prior Publication Data

US 2002/0023449 A1 Feb. 28, 2002

(30) Foreign Application Priority Data

Dec. 1, 2000 (KR) .......................... 2000-72442

(51) Int. Cl.$^7$ ................................. F04B 39/10
(52) U.S. Cl. ............... 417/549; 417/417; 417/545; 417/547; 251/65; 251/357; 251/368
(58) Field of Search .................... 417/417, 545, 417/547, 550, 549; 251/65, 357, 368, 129.15

(56) References Cited

U.S. PATENT DOCUMENTS 6,202,791 B1 * 3/2001 Oh et al. .................... 184/6.16

* cited by examiner

Primary Examiner—Charles G. Freay
Assistant Examiner—Emmanuel Sayoc
(74) Attorney, Agent, or Firm—Birch, Stewart, Kolasch & Birch, LLP

(57) ABSTRACT

A valve fastening structure of a reciprocating compressor is provided. The valve fastening structure of the reciprocating compressor includes a piston, which is combined with a moving magnet of a driving motor and is in a linear reciprocating motion inside a cylinder and in which a refrigerant channel is formed in the direction of the reciprocating motion, a suction valve arranged in the leading end of the piston, the suction valve for opening and shutting the refrigerant channel of the piston, and magnets inserted into and fixed to the leading end of the piston, the magnets for fixing the suction valve by magnetic force. It is possible to minimize dead volume in the cylinder and to easily control the stroke of the piston by establishing the suction valve as the cardinal point during the controlling of the stroke of the piston. Accordingly, the efficiency of the compressor is improved. Also, it is possible to improve the reliability of the compressor by preventing the suction valve from being deteriorated when the suction valve is used for a long time or preventing the suction valve from being damaged by excessive suction pressure.

5 Claims, 5 Drawing Sheets

VALVE FASTENING STRUCTURE OF A RECIPROCATING COMPRESSOR UTILIZING PERMANENT MAGNETS

BACKGROUND OF THE INVENTION

1. Field of the Invention

The present invention relates to a valve fastening structure of a reciprocating compressor, and more particularly, to a valve fastening structure of a reciprocating compressor for fixing a suction valve to a piston using a magnet.

2. Description of the Background Art

In general, the suction valve of a compressor, which is arranged in the suction side of a compression space, is opened and shut according to a pressure difference during the suction and compression motions of a piston, and thus restricts the degree of suction of fluid. FIG. 1 is a vertical sectional view showing an example of a reciprocating compressor, in which such a suction valve is loaded.

As shown in FIG. 1, a conventional reciprocating compressor includes a ring-shaped frame 1 installed inside a casing V, whose bottom is filled with oil, a cover 2 fixedly installed on one side of the frame 1, a cylinder 3 fixed to the center of the frame 1 in a horizontal direction, an inner stator assembly 4A fixed to the outer circumference of the frame 1 that supports the cylinder 3, an outer stator assembly 4B fixed to the outer circumference of the inner stator assembly 4A with a predetermined slit between the inner stator assembly 4A and the outer stator assembly 4B, a magnet assembly 5, which is interposed in the slit between the inner stator assembly 4A and the outer stator assembly 4B and forms the moving magnet of a driving motor (not shown), a piston 6, which is integrally fixed to the magnet assembly 5, the piston 6 for sucking up/compressing refrigerant gas, while being in a sliding motion inside the cylinder 3, an inner resonance spring 7A and an outer resonance spring 7B for inducing the magnet assembly 5 to be continuously in a resonant motion in the slit between the inner stator assembly 4A and the outer stator assembly 4B, and a discharge valve assembly 8, which is loaded in the leading end of the cylinder 3, the discharge valve assembly 8 for restricting the discharge of compression gas during the reciprocating motion of the piston 6.

As shown in FIGS. 2A and 2B, in the piston 6, a head 6b is formed in the front part of a body 6a of a predetermined length. A connector 6c connected to the magnet assembly 5 is formed in the hind part of the body 6a. A refrigerant channel F for guiding the refrigerant gas to the cylinder 3 is formed in the body 6a and the head 6b. A suction valve 9 for restricting the suction of the refrigerant gas through the refrigerant channel F is fastened and fixed to the front part of the head 6b of the piston 6 by a fixing bolt B. Reference numerals 6d, 9a, 9b, DP, SP, and O respectively denote a gas opening, a switching portion, valve fastening through hole, a discharge pipe, a suction pipe, and an oil feeder.

The conventional reciprocating compressor operates as follows.

When current is applied to the inner and outer stator assemblies 4A and 4B to thus let the magnet assembly 5 be in a linear reciprocating motion, the piston 6 combined with the magnet assembly 5 is in the linear reciprocating motion inside the cylinder 3, thus causing a pressure difference in the cylinder 3. The refrigerant gas in the casing V is sucked up into the cylinder 3 through the refrigerant channel F of the piston 6 due to the pressure difference in the cylinder 3 and is compressed and discharged. Such a series of processes are repeated.

At this time, when the piston 6 moves toward the hind part and sucks up the refrigerant gas, the refrigerant gas pushes aside the suction valve 9, while passing through the refrigerant channel F and the gas opening 6d. Therefore, the suction valve 9 does not drift away due to the reciprocating motion of the piston 6 to thus maintain the realiability of the compressor when the suction valve 9 is firmly loaded in the piston 6.

This is why a method of fastening the suction valve 9 to the leading end of the head 6b of the piston 6 using the additional fixing bolt B is disclosed in a conventional technology, as shown in FIGS. 2A and 2B.

However, in such a conventional suction valve combining apparatus, since the head of the fixing bolt B protrudes into the compression space of the cylinder 3, a dead volume is created to thus deteriorate compression efficiency. Also, it is difficult to sense the positions of the top dead center and the bottom dead center of the piston 6 due to the head of the protruding fixing bolt B. Accordingly, it is difficult to control stroke with respect to the reciprocating motion of the piston 6.

In the suction valve fixing structure of the reciprocating compressor, as shown in FIGS. 3A and 3B, the suction valve 9 is directly loaded in the leading end of the piston 6 by welding in order to minimize the dead volume and to easily control the stroke of the piston. Reference numeral W denotes a welding point.

However, when the suction valve 9 is combined with the leading end of the piston 6 by welding, poor welding may be caused since the piston 6 is formed of cast iron in consideration of castability and the suction valve 9 is formed of high-carbon spring steel. Accordingly, the reliability of the compressor deteriorates.

SUMMARY OF THE INVENTION

Therefore, an object of the present invention is to provide a valve fastening structure of a reciprocating compressor, which is capable of minimizing a dead volume between a cylinder and a piston, easily controlling the stroke of the piston, and firmly fixing a suction valve to the piston.

To achieve these and other advantages and in accordance with the purpose of the present invention, as embodied and broadly described herein, there is provided a valve fastening structure of a reciprocating compressor, comprising a piston, which is combined with a moving magnet of a driving motor and is in a linear reciprocating motion inside a cylinder and in which a refrigerant channel is formed in the direction of the reciprocating motion, a suction valve arranged in the leading end of the piston, the suction valve for opening and shutting the refrigerant channel of the piston, and magnets inserted into and fixed to the leading end of the piston, the magnets for fixing the suction valve by magnetic force.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

The valve fastening structure of the reciprocating compressor according to the present invention will now be described in detail with reference to an embodiment shown in the accompanying drawings.

Figure 4A:
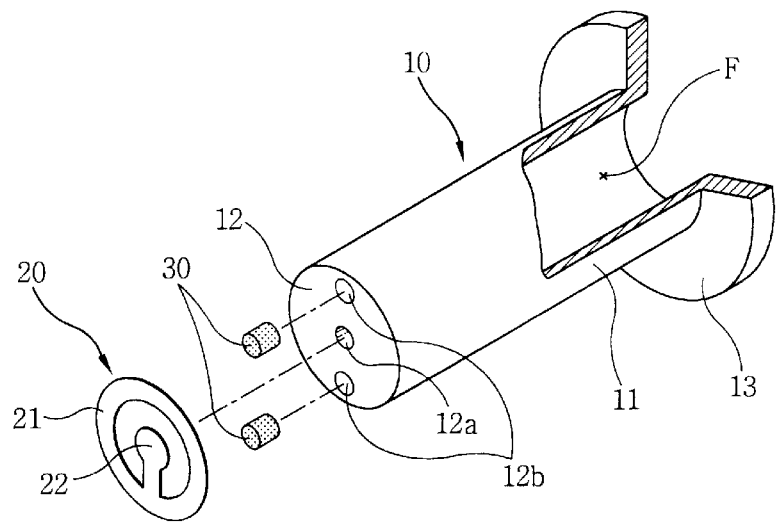
FIG. 4A is a disassembled perspective view showing an example of a valve fastening structure of a reciprocating compressor according to the present invention.
Figure 4B:
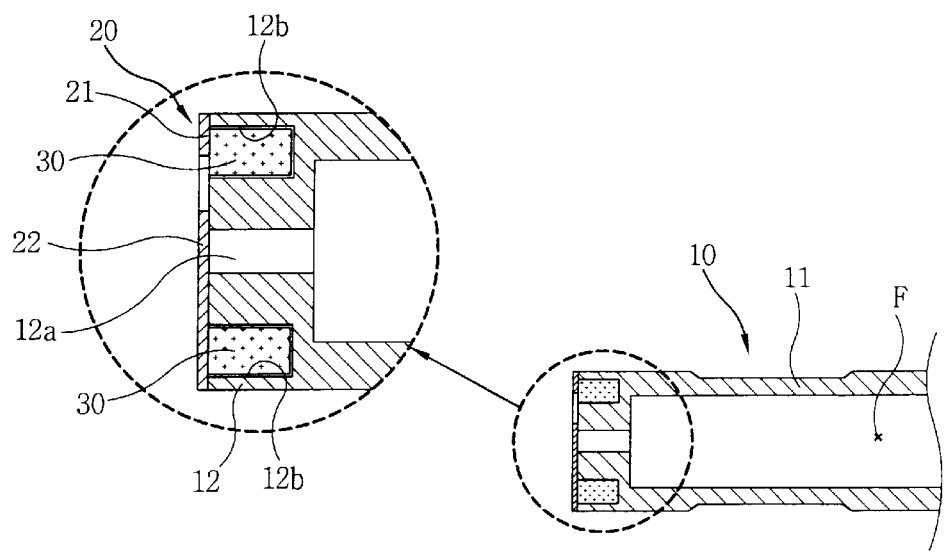
FIG. 4B is an assembled vertical sectional view showing the example of the valve fastening structure of the reciprocating compressor according to the present invention.
Figure 5A:
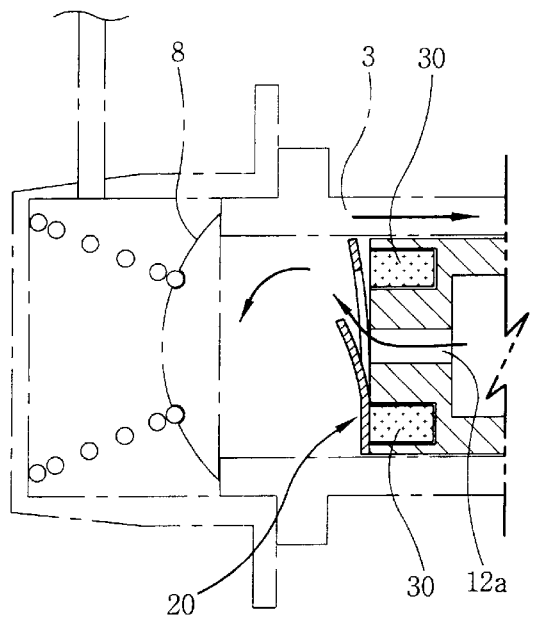
FIG. 5A is a vertical sectional view showing the open action of a suction valve during the reciprocating motion of a piston in the suction valve fastening structure for the compressor according to the present invention.
Figure 5B:
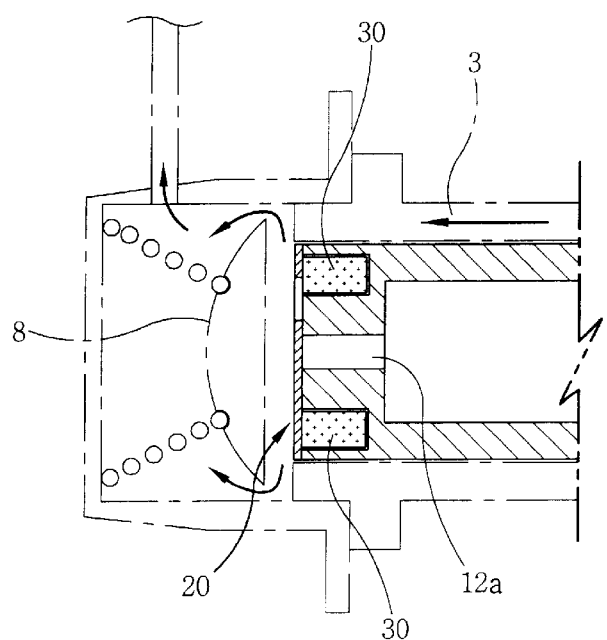
FIG. 5B is a vertical sectional view showing the shut action of a suction valve during the reciprocating motion of the piston in the suction valve fastening structure for the compressor according to the present invention.

FIG. 4A is a disassembled perspective view showing an example of a valve fastening structure of a reciprocating compressor according to the present invention. FIG. 4B is an assembled vertical sectional view showing the example of the valve fastening structure of the reciprocating compressor according to the present invention. FIG. 5A is a vertical sectional view showing the open action of a suction valve during the reciprocating motion of a piston in the suction valve fastening structure for the compressor according to the present invention. FIG. 5B is a vertical sectional view showing the shut action of a suction valve during the reciprocating motion of the piston in the suction valve fastening structure for the compressor according to the present invention.

Figure 1:
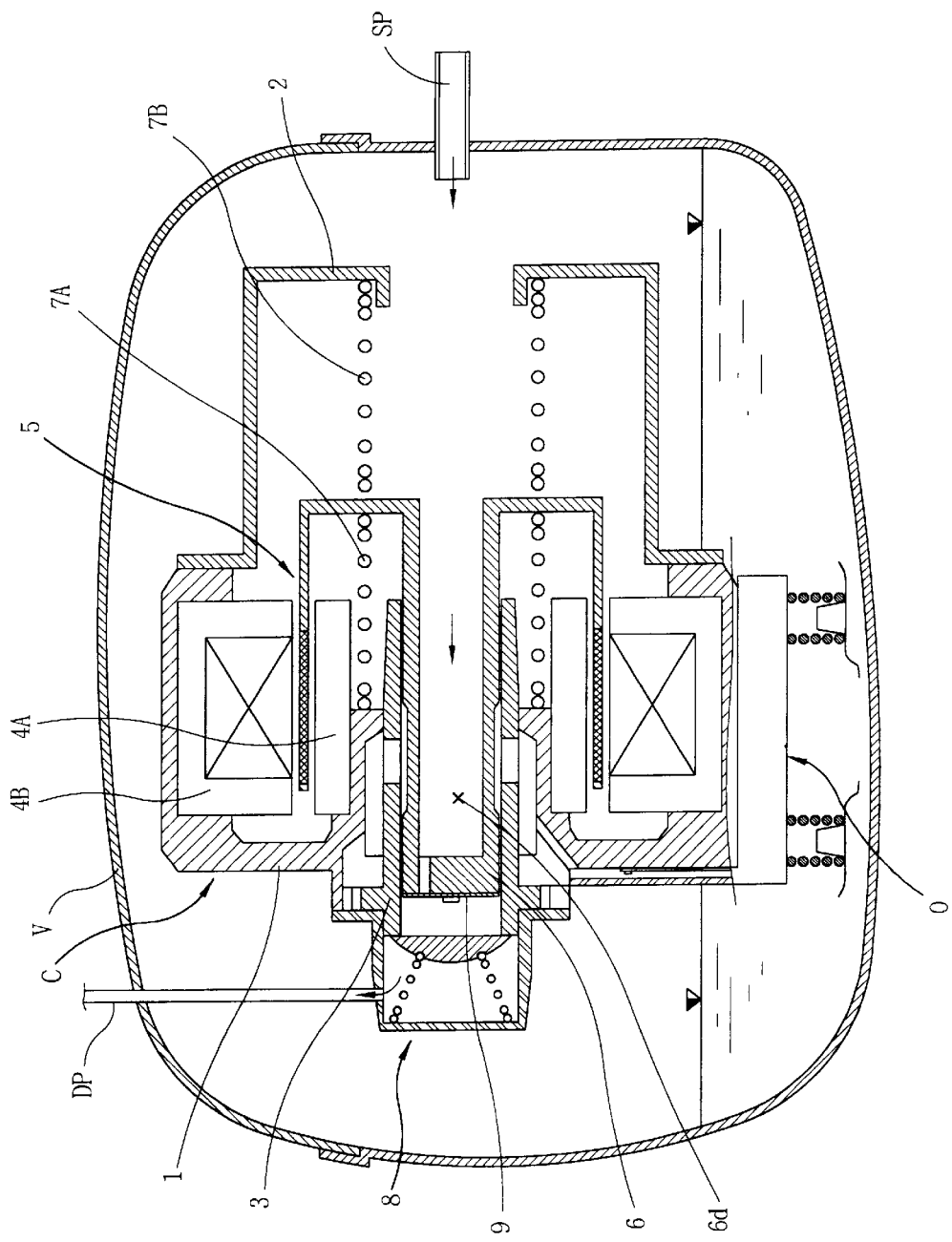
FIG. 1 is a vertical sectional view showing an example of a conventional reciprocating compressor.
Figure 2A:
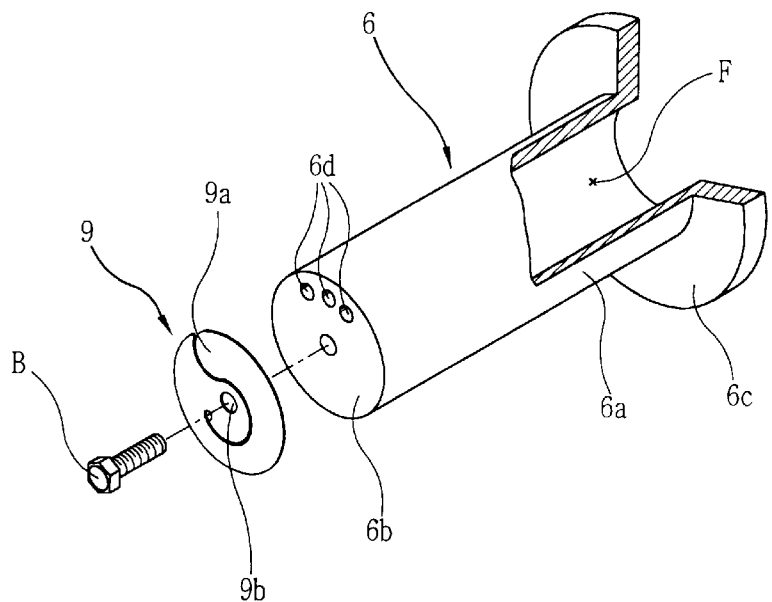
FIG. 2A is a disassembled perspective view showing an example of a suction valve fastening structure of the conventional reciprocating compressor.
Figure 2B:
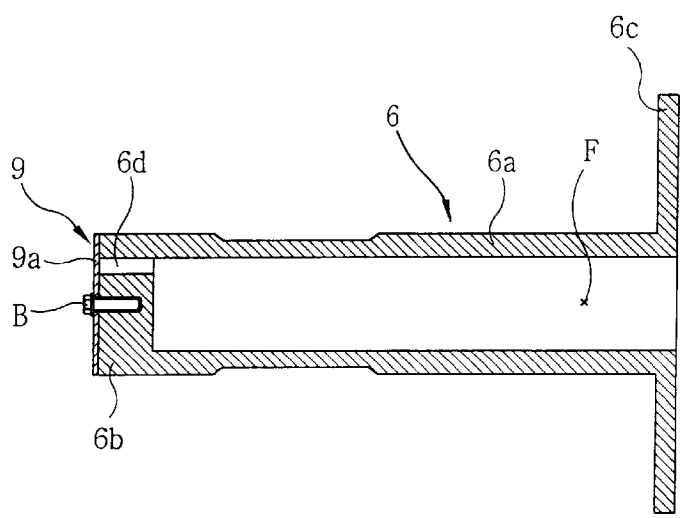
FIG. 2B is an assembled vertical sectional view showing the example of the suction valve fastening structure of the conventional reciprocating compressor.
Figure 3A:
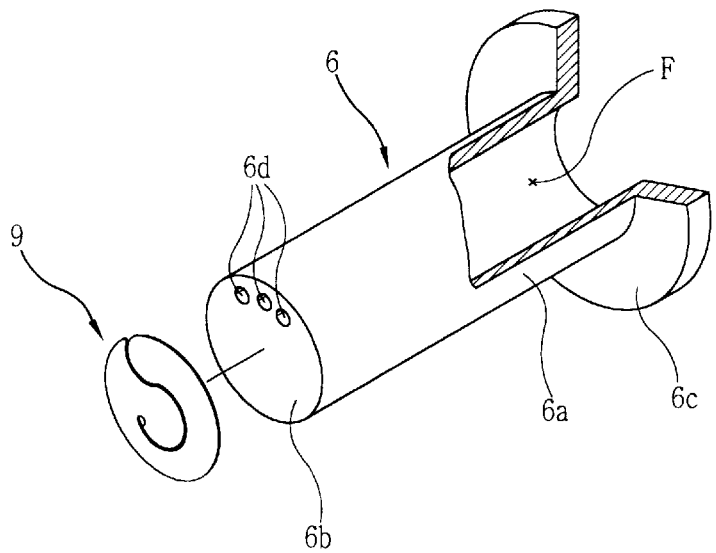
FIG. 3A is a disassembled perspective view showing a modification of the suction valve fastening structure of the conventional reciprocating compressor.
Figure 3B:
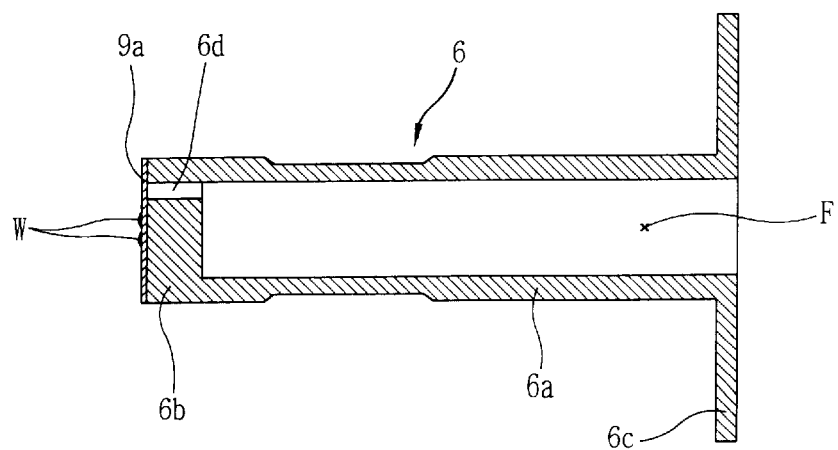
FIG. 3B is an assembled vertical sectional view showing the modification of the suction valve fastening structure of the conventional reciprocating compressor.

As shown in FIGS. 4A, 4B, 5A, and 5B, the valve fastening structure of the reciprocating compressor according to the present invention includes a piston 10, which is combined with a magnet assembly (shown in FIG. 1) 5 that is the moving magnet of a driving motor (not shown) and is inserted into a cylinder (shown in FIG. 1) 3 such that the piston 10 slides inside the cylinder 3, a metal suction valve 20, which is arranged in the leading end of the piston 10, the suction valve 20 for opening and shutting a refrigerant channel F, and magnets 30 for fixing and attaching the suction valve 20 to the leading end of the piston 10.

In the piston 10, a head 12 is formed in the front part of a body 11 of a predetermined length. A connector 13 connected to the magnet assembly 5 is formed in the hind part of the body 11. The refrigerant channel F for guiding refrigerant gas to the cylinder 3 is formed in the middle of the body 11.

A gas opening 12a connected to the refrigerant channel F is penetratingly formed in the middle of the head 12. Two magnet fixing grooves 12b for loading the magnets 30 are concavely formed on both sides of the gas opening 12a.

A ring-shaped supporter 21 is formed in the suction valve 20. A switching portion 22, which is extended from one side of the supporter 21 to the center of the supporter 21 and is in the form of a cantilever beam, is formed. The supporter 21 is formed to have a width corresponding to the outer diameter of each magnet 30 loaded in the leading end of the piston 10. The switching portion 22 is arranged to face the gas opening 12a of the piston 10 and is formed to have an area wider than the area of the gas opening 12a. The magnets 30 are press fitted in, to thus be fixed to the magnet fixing grooves 12b formed in the leading end of the piston 10. When the two magnets 30 are provided like in the present embodiment, the magnets 30 are preferably arranged such that the polarities of each magnet 30 cross each other in order to prevent flux from leaking. That is, when the plurality of magnets 30 are used, the magnets 30 are arranged such that the polarities of each magnet 30 cross each other in order to prevent the flux from leaking to strong magnetic substances arranged around the magnets 30.

Also, the magnetic force created by the plurality of magnets 30 preferably has the magnitude corresponding to the magnetism and the magnetic weight of the suction valve so that the magnetic force is appropriate for attracting the suction valve.

The same reference numerals are given to the elements identical to the elements in the conventional technology.

The valve fastening structure of the reciprocating compressor according to the present invention has the operations and the effects, which will now be described.

When power is applied to the driving motor (not shown), to thus let the magnet assembly (shown in FIG. 1) 5 that is a moving magnet be in a linear reciprocating motion, the piston 10 combined with the magnet assembly 5 is in a linear reciprocating motion inside the cylinder 3 and sucks up the refrigerant gas filled in an airtight casing (shown in FIG. 1) V and compresses and then, discharges the refrigerant gas. Such a series of processes are repeated.

As shown in FIG. 5A, when the piston 10 moves to the right side of FIG. 5A and sucks up the refrigerant gas, the refrigerant gas is sucked up along the refrigerant channel F and the gas opening 12a of the piston 10, opens the suction valve 20 loaded in the head 12 of the piston, and is sucked up into the compression space of the cylinder 3.

Since the switching portion 22 of the suction valve 20 remains released while the supporter 21 of the suction valve 20 is fixed to the magnets 30 loaded in the leading end of the piston 10, the switching portion 22 is bent by the suction pressure of the refrigerant gas sucked up through the refrigerant channel F and the gas opening 12a of the piston 10 and is separated from the piston 10. Accordingly, the refrigerant gas is sucked up into the compression space.

When overpressure is applied to the suction valve 20 because the refrigerant gas is excessively sucked up, the supporter 21 of the suction valve 20 is minutely separated from the magnets 30. Accordingly, it is possible to avoid excessive stress to be applied to the suction valve 20, and to thus prevent the suction valve 20 from being damaged. During the compression of the refrigerant gas by the piston 10, which will now be mentioned, the suction valve 20 separated from the piston 10 is easily fixed to the piston 10 by the magnetic force of the magnets 30.

As shown in FIG. 5B, when the piston 10 moves to the left side of FIG. 5B and compresses the refrigerant gas, the suction valve 20 loaded in the head 12 of the piston 10 closes the refrigerant opening 12a and compresses the refrigerant gas filled in the cylinder 3. In this process, a discharge valve 8 is opened and compression gas is discharged the moment the pressure of the compression space of the cylinder 3 is no less than a predetermined value.

The suction valve 20 is fixed to the piston 10 by the magnets 30 previously press fitted in the piston 10. Accordingly, because the suction valve 20 can maximally approach the discharge valve 8 during the reciprocating motion of the piston 10, dead volume in the cylinder 3 is hardly created. Also, because no element protrudes toward the leading end of the piston 10, it is possible to easily sense the correct position of the piston 10. Accordingly, it is possible to easily control the stroke of the piston 10.

Also, because the suction valve 20 is not welded, it is possible to prevent the suction valve 20 from being damaged by welding heat. Also, it is possible to avoid the excessive stress to be applied to the suction valve 20 because the suction valve 20 is instantaneously separated from the magnets 30 during overload created during the suction of the refrigerant gas. Accordingly, it is possible to prevent the suction valve 20 from being damaged by overload during the suction of the refrigerant gas. As a result, it is possible to improve the reliability of the compressor.

In the valve fastening structure of the reciprocating compressor according to the present invention, it is possible to minimize dead volume in the cylinder by loading the magnets in the leading end of the piston and attaching and fixing the suction valve to the magnets. Also, it is possible to easily control the stroke of the piston by establishing the leading end of the piston as the cardinal point during the controlling of the stroke of the piston. Accordingly, the efficiency of the compressor is improved.

Also, it is possible to improve the reliability of the compressor by preventing the suction valve from being deteriorated when the suction valve is used for a long time or preventing the suction valve from being damaged by excessive suction pressure.

What is claimed is:

1. A valve fastening structure of a reciprocating compressor, comprising:

a piston, which is combined with a moving magnet of a driving motor and is in a linear reciprocating motion inside a cylinder and in which a refrigerant channel is formed in the direction of the reciprocating motion;

a suction valve arranged in a leading end of the piston, the suction valve for opening and shutting the refrigerant channel of the piston; and magnets inserted into and fixed to the leading end of the piston, the magnets for fixing the suction valve by magnetic force.

2. The valve fastening structure of claim 1, wherein the magnets are fixed to the piston by a press fit method.

3. The valve fastening structure of claim 1, wherein the magnets are arranged such that the polarities of each magnet cross each other.

4. The valve fastening structure of claim 3, wherein the magnitude of the magnetic force created by the magnets is set to correspond to the magnetism and the magnetic weight of the suction valve so that the magnetic force is appropriate for attracting the suction valve.

5. The valve fastening structure of claim 4, wherein the magnitude of the magnetic force created by the magnets is set to prevent the generation of the stress of the suction valve by letting the whole suction valve operate when excessive pressure is applied to the suction valve during the suction of refrigerant gas.

* * * * *